US011008998B2

(12) United States Patent
Koncar et al.

(10) Patent No.: US 11,008,998 B2
(45) Date of Patent: May 18, 2021

(54) FLOATING SCREW TURBINES DEVICE (71) Applicant: UPRAVLJANJE KAOTICNIM SUSTAVIMA J.D.O.O., Zagreb (HR)

(72) Inventors: Nenad Koncar, Zagreb (HR); Sanjin Sokolic, Samobor (HR); Jure Mustra, Split (HR); Denis Vukman, Trogir (HR); Zoran Macut, Split (HR); Jozo Milat, Trogir (HR)

(73) Assignee: Upravljanje Kaoticnim Sustavima d.o.o., Zagreb (HR)

( * ) Notice: Subject to any disclaimer, the term of this patent is extended or adjusted under 35 U.S.C. 154(b) by 39 days.

(21) Appl. No.: 16/340,160

(22) PCT Filed: Oct. 27, 2016

(86) PCT No.: PCT/EP2016/076002
§ 371 (c)(1),
(2) Date: Apr. 8, 2019

(87) PCT Pub. No.: WO2018/077414
PCT Pub. Date: May 3, 2018

(65) Prior Publication Data
US 2019/0309724 A1 Oct. 10, 2019

(51) Int. Cl.
*F03B 11/02* (2006.01)
*F03B 3/04* (2006.01)
(Continued)

(52) U.S. Cl.
CPC ............. *F03B 11/02* (2013.01); *F03B 3/04* (2013.01); *F03B 3/121* (2013.01); *F03B 13/264* (2013.01);
(Continued)

(58) Field of Classification Search
CPC .. F03B 3/00; F03B 11/00; F03B 11/02; F03B 13/26; F03B 13/264; F03B 15/02;
(Continued)

(56) References Cited

U.S. PATENT DOCUMENTS 1,025,929 A   5/1912   Snook
1,729,362 A * 9/1929   Ruthven .............. F03B 17/06
                                             416/13
(Continued)

FOREIGN PATENT DOCUMENTS

DE   102010048791 A1   4/2012
EP       2003332 A1    12/2008
(Continued)

OTHER PUBLICATIONS

Lago et al., "Advances and trends in hydrokinetic turbine systems," Energy for Sustainable Development 14 (2010) 287-296.
(Continued)

*Primary Examiner* — David Hamaoui
*Assistant Examiner* — Brian O Peters
(74) *Attorney, Agent, or Firm* — Ratner Prestia (57) ABSTRACT

A floating screw turbine device with adjustable rear deflectors/diffusors is disclosed. Three pontoons, spaced apart, carry water ducts in which screw turbines are mounted. Screw turbines, mounted in a V configuration, have mirror symmetrical pitches of the screws measured over the centre of symmetry that passes through the central pontoon. Such a configuration minimizes the vibration of the device. Rear deflectors/diffusors have an adjustable pitch relative to the floors of the water ducts by which they can affect the water flow velocity through the water ducts. In one embodiment, the optimum pitch is selected according to the previously performed computational fluid dynamics simulation for the device, where the pitch is changed using hydraulic or
(Continued)

electromechanical actuators. In another variant an artificial neural network is taught to model a global function of the system dynamics in order to achieve optimal operation.

14 Claims, 4 Drawing Sheets (51) Int. Cl.
*F03B 3/12* (2006.01)
*F03B 13/26* (2006.01)
*F03B 17/06* (2006.01)

(52) U.S. Cl.
CPC ......... *F03B 17/061* (2013.01); *F05B 2210/11* (2013.01); *F05B 2220/32* (2013.01); *F05B 2240/12* (2013.01); *F05B 2240/13* (2013.01); *F05B 2240/14* (2013.01); *F05B 2240/243* (2013.01); *F05B 2240/932* (2013.01); *F05B 2250/25* (2013.01); *F05B 2260/80* (2013.01); *Y02E 10/20* (2013.01)

(58) Field of Classification Search
CPC .... F03B 17/06; F03B 17/061; F05B 2210/11; F05B 2220/32; F05B 2240/13; F05B 2240/243; F05B 2240/932
See application file for complete search history.

(56) References Cited

U.S. PATENT DOCUMENTS

| | | | | |
|---|---|---|---|---|
| 1,745,356 | A * | 2/1930 | Crofton | F03B 17/063 416/86 |
| 8,344,535 | B2 * | 1/2013 | Pitre | F03D 13/25 290/54 |
| 9,279,407 | B2 * | 3/2016 | Sinclaire | F03B 13/264 |
| 2007/0020097 | A1 * | 1/2007 | Ursua | F03B 17/062 415/213.1 |
| 2008/0303288 | A1 * | 12/2008 | Hamann | F03B 13/08 290/55 |

FOREIGN PATENT DOCUMENTS

| | | | | |
|---|---|---|---|---|
| EP | 2136072 | A1 | | 12/2009 |
| EP | 2388472 | A1 * | 11/2011 | ............ F03B 17/061 |
| EP | 2531719 | B1 | | 8/2015 |
| JP | 4753382 | B2 | | 6/2011 |
| WO | 2004067957 | A1 | | 8/2004 |
| WO | 2006059094 | A1 | | 6/2006 |
| WO | 2010002778 | A2 | | 1/2010 |
| WO | 2011039406 | A1 | | 4/2011 |
| WO | 2012019307 | A1 | | 2/2012 |
| WO | 2014122731 | A1 | | 8/2014 |
| WO | 2015055962 | A1 | | 4/2015 |
| WO | WO-2017070783 | A1 * | 5/2017 | ............ F03B 13/264 |

OTHER PUBLICATIONS

Kirke, "Developments in ducted water current turbines," Tidal Paper Aug. 3, 2016, Appendix 3.1, 12 pages.
Stefánsson et al., "A note on the Gamma test," Neural Computing & Applications (1997), 5:131-133.
"Review of Selected Tidal Power Technologies, Final Report," Sep. 20, 2012, ICF Marbek, 54 pages.
International Search Report issued in PCT/EP2016/076002, dated Jun. 30, 2017, 6 pages.
Written Opinion of the International Searching Authority issued in PCT/EP2016/076002, dated Jun. 30, 2017, 8 pages.

* cited by examiner

FLOATING SCREW TURBINES DEVICE

CROSS REFERENCE TO RELATED APPLICATIONS

This application is the U.S. National Phase Application of PCT/EP2016/076002, filed Oct. 27, 2016, the contents of such application being incorporated by reference herein.

TECHNICAL FIELD

Present invention relates to a floating screw turbines device with adjustable rear deflectors/diffusors where a liquid flow, i.e. its kinetic energy, is converted by means of turbines to rotary motion. The invention uses paired screw turbines with their rotation axis inclined to the direction of fluid flow. The invention is focused on components used for improvement of the turbine's technical characteristics, more particularly, on use of rear deflectors/diffusors on previously known turbine devices for maximisation of the extracted energy from a water flow.

Technical Problem

The essential technical problem which is solved by an aspect of the invention is an improvement in technical characteristics of floating screw turbine devices with respect to energy conversion form the liquid flow. The term—screw turbine—as used herein refers to any helical turbine used in the art. Improvement is achieved by selected geometry of rear deflectors/diffusors which are mounted at the end of each corresponding turbine duct, where each deflector/diffusor modifies the liquid flow through the corresponding duct. The deflectors/diffusors are independently adjustable to maximize the fluid velocity across the ducts and therefore modify the power that can be delivered by the system. Each deflector's/diffusor's pitch can be independently regulated. By using previously calculated data obtained via computational fluid dynamics (CFD) simulation and data regarding the measured liquid flow velocity, it is possible to achieve maximum power extraction via an optimum position of the deflectors/diffusors.

A secondary technical problem, solved by an aspect of the invention, is that the provided solution has to be durable and safe. Namely, the turbine system uses advantages that are already known in the art for a V-formation floating turbines device; such as: minimization or cancelation of turbines device vibrations, resistivity to possible stacking of unwanted floating objects in turbine ducts and preservation of river/marine life, i.e. fish, which can easily pass unaffected through the screw turbine blades because of their slow rotation.

PREVIOUS STATE OF ART

The review of previous art is started with floating screw turbines used for direct conversion of kinetic energy of the liquid flow into turbine rotary motion.

The patent application published as WO2012/019307A1, incorporated by reference herein, for the invention: System and method for generating electrical power from a flowing current of fluid; inventor S. Ross, teaches in one of its embodiments about a pair of screw turbines, arranged in V-shape that provide symmetry and counteract reactive torque, as depicted in FIG. 6A of the cited document. The power plant which consists of many turbine devices is shown in FIG. 6B of the cited document. The document remains silent regarding the possible use of deflectors/diffusors for maximizing the extracted power.

The patent application published as WO2004/067957A1, incorporated by reference herein, for the invention: A Screw turbine device; inventor J. I. Eielsen, teaches about a screw turbine device positioned at an angle close to 450 to the direction of the fluid flow, as shown in FIG. 2 of cited document. The document remains silent regarding the possible use of deflectors/diffusors for maximizing the extracted power. This document is interesting, having in mind that a similar turbine construction is used within the present invention.

The patent application published as EP2003332A1, incorporated by reference herein, for the invention: Water power plant; inventor G. Wolff, teaches about a screw turbine device that is also positioned at an angle close to 450 to the direction of fluid flow, as shown in FIG. 1 of the document. The document remains silent regarding the possible use of deflectors/diffusors for maximizing the extracted power.

The article entitled: Review of Selected Tidal Power Technologies; incorporated by reference herein, formed by authors from ICF Marbek, 300-222 Somerset Street West Ottawa, Ontario K2P 2G3, as elaborated in:
jupiterhdrocomSiteAssets/industry/
IcfMarbek%20Tidal%20Energy%20Report_20%2009%2012_Final.pdf
incorporated by reference herein, discloses the current trends in the mentioned technology. The trends are generally oriented towards submersed turbines which are free from ducts, or mounted within the ducts with corresponding rigid, i.e. nonadjustable, deflectors/diffusors.

The article by B. Kirke: Developments in ducted water current turbines; incorporated by reference herein, as elaborated in:
citeseerx.ist.psu.edu/viewdoc/
download?doi=10.1.1.531.3501&rep=rep1&type=pdf
incorporated by reference herein, teaches about the advantages of using a ducted turbine and gives data regarding the performance of an open and ducted straight-blade Darrieus turbine.

The article: L. I. Lago, F. L. Ponta, L. Chen: Advances and trends in hydrokinetic turbine systems; Energy for Sustainable Development, Volume 14, Issue 4 (2010) 287-296; incorporated by reference herein, as elaborated in:
tepeu.sisal.unam.mx/oceanenergybiblio/LagoAdvances-TrendsHydrokinetic.pdf
describes current trends regarding turbine systems. The above cited article discusses many solutions, but the cited solutions and related concepts are not oriented much towards the floating screw turbines.

The patent application published as WO2014/122731A1, incorporated by reference herein, for the invention: Power generation system; inventor K. Hayamizu, teaches about a floating ducted hydro-turbine. What is important, the solution has hollow bodies equipped with hydrofoils at the downstream end of the floating body that have the task of stabilizing the whole turbine during the power extraction. Hydrofoils, as far as can be deducted, are not adjustable. Therefore, the object of the cited invention is different than technical problems stated earlier.

The patent application published as DE102010048791, incorporated by reference herein, for the invention: Floating water turbine installation has a floating gate whose bottom slope is designed according to the principle of an inclined plane for flow acceleration such that the bottom slope leads to flow acceleration with a smaller flux flow velocity; inventor H. Lehner. This document teaches about a floating water turbine installation which has a duct where the bottom slope of the duct leads to flow acceleration when the flow velocity is small. The document does not reveal the idea that this downstream end can be adjusted and therefore capable of optimising the turbine's power output. Also, a waterwheel seems to be less effective for efficient power extraction.

The patent application published as WO2011/039406A1, incorporated by reference herein, for the invention: Device for producing energy by hydropower; inventor J. Einolander, teaches about a floating water turbine installation which has a semi-open duct where the inlet and outlet slope of the turbine system is curved. In one solution, the whole system can be tilted in order to produce increased flow due to difference in a potential energy of the water on duct inlet and duct outlet. However, it is not explained how the whole river level can be elevated except if the turbine system is a wide as the entire river flow. Also, a waterwheel seems to be less effective for energy extraction, similar as above cited prior art.

The patent published as JP4753382B2, incorporated by reference herein, for the invention: Moored floating type hydraulic power generator; inventor K. Nakajima, teaches about a floating type hydraulic power generator. In one embodiment, shown in FIGS. 6 and 9, the discharged part is equipped with a wide hydrofoil which increases the difference in the potential energy of the water on the duct inlet and the duct outlet. It seems that the document remains silent whether or not the hydrofoil position can be adjusted for maximisation of power extraction.

The patent published as EP2531719B1, incorporated by reference herein, for the invention: Hydroelectric power plant; inventor W. Stein, teaches about a floating ducted turbine device where the inlet unit has adjustable walls and the rotor's position is adjustable in three dimensions in respect to the duct. From FIG. 2, it is obvious that no attention is paid to the downstream part of the duct, or the possibility of constructing adjustable diffusors. The invention is concentrated with the feature where the rotor with blades is entirely immersed within the water.

The patent application published as WO2015/055962A1, incorporated by reference herein, for the invention: Compact floating hydroelectric plant; inventor J.-L. Achard, teaches about a floating ducted turbine system with rear diffusors. It seems that the rear diffusors, formed vertically are fixed and have a different technical role than diffusers used within the present invention. In the cited document's rear diffusors seem to minimise the interference between the turbines.

Considering the teachings of the cited documents, it seems that the present invention uses, in a new and unexpected way, rear deflectors/diffusors in combination with a V-shaped screw turbines to maximise the power extracted from a river flow.

SUMMARY OF INVENTION

An aspect of the present invention discloses a floating screw turbines device with adjustable rear deflectors/diffusors. The device consists of three pontoons spaced apart and fixed to the deck frame. The left water duct is situated between left pontoon and the central pontoon. The right water duct is situated between the central pontoon and the right pontoon. The left and the right side of the device are defined in a way that the device is viewed from the perspective where the water enters into the water ducts. Each of the water ducts is fixed to the deck frame and to the adjacent pontoons via corresponding duct holders.

The left screw turbine is fixed within the left water duct by a pair of turbine shaft holders holding the left turbine shaft on its ends. The right screw turbine is fixed within the right water duct by a pair of turbine shaft holders holding the right turbine shaft on its ends. The turbine shaft holders are fixed to the deck frame.

The left screw turbine and the right screw turbine are mounted in the corresponding ducts forming a V turbines formation. The turbine shafts, when extrapolated, intersect at the point situated at the centre plane of symmetry which passes through the central axis of the central pontoon and is perpendicular to the water surface. The turbine shafts are situated parallel to the water surface and are both inclined by the same angle relative to the central pontoon. The angle is usually selected to be between 30°-60°, depending on used screw turbines. The screw turbines have a mirror symmetrical pitch of the screws measured in regards to the centre plane of symmetry.

Each of the water ducts have, at the water outlet behind the corresponding turbines, a corresponding deflector/diffusor connected by a set of hinges to the corresponding deflector/diffusor connection line situated at the bottom of the corresponding water duct. Left deflector/diffusor connection line is parallel to the left turbine shaft, and right deflector/diffusor connection line is parallel to the right turbine shaft. Again, said deflector/diffusor connection lines, when extrapolated, intersect at the point situated at the centre plane of symmetry. Deflectors/diffusors are capable of rotating around their corresponding connection lines, thus affecting the water flow velocity across water ducts by controlling their relative pitch with respect to the floor of water ducts bottoms.

In the preferred embodiment, the deflector's/diffusor's ends are formed so as to be parallel to the corresponding deflector/diffusor connection lines.

In another embodiment, deflectors/diffusors are held in the desired position relative to the water duct by locking the pitch of the hinges by a set of wedges.

In yet another embodiment, deflectors/diffusors are continuously adjustable in time to the desired position relative to the water ducts by using hydraulic or electromechanical actuators. In one variant, the deflectors/diffusors are continuously adjustable in accordance with the inlet water flow velocity where the deflectors'/diffusors' pitch is selected according to previously performed computational fluid dynamics simulation for the turbine device in order to maximize fluid velocity across the water ducts. In another variant a proportional-integral-derivative controller is used for the same purpose. The water flow velocity can be measured in one or more points used contact or non-contact velocity measuring systems, such as Doppler radar devices mounted on the deck frame.

Two or more floating screw turbines devices with adjustable rear deflectors/diffusors can be used in a parallel, serial or mixed configuration for converting the fluid flow into rotational mechanical power.

BRIEF DESCRIPTION OF DRAWINGS

One of selected embodiments of the floating/submersed screw turbine device, with adjustable rear deflectors/diffusors; is depicted in FIGS. 1-7. The electromechanical, hydraulic, or mechanical parts used for adjusting and regulating the pitch of the rear deflectors/diffusors are not shown having in mind that it would render the FIGS. unclear.

DETAILED DESCRIPTION

An aspect of the present invention relates to the floating screw turbines device with adjustable rear deflectors/diffusors where a liquid flow, i.e. its kinetic energy, is converted to turbines rotary motion. In this detailed description, only one embodiment will be discussed in detail, with possible variants. The average person skilled in the art will simply deduce trivial variants of an aspect of the invention. As mentioned earlier, the term—screw turbine—as used herein refer to any helical turbine used in the prior art. A particularly good review, with examples, is given in the previously cited document WO2012/019307A1.

Figure 1:
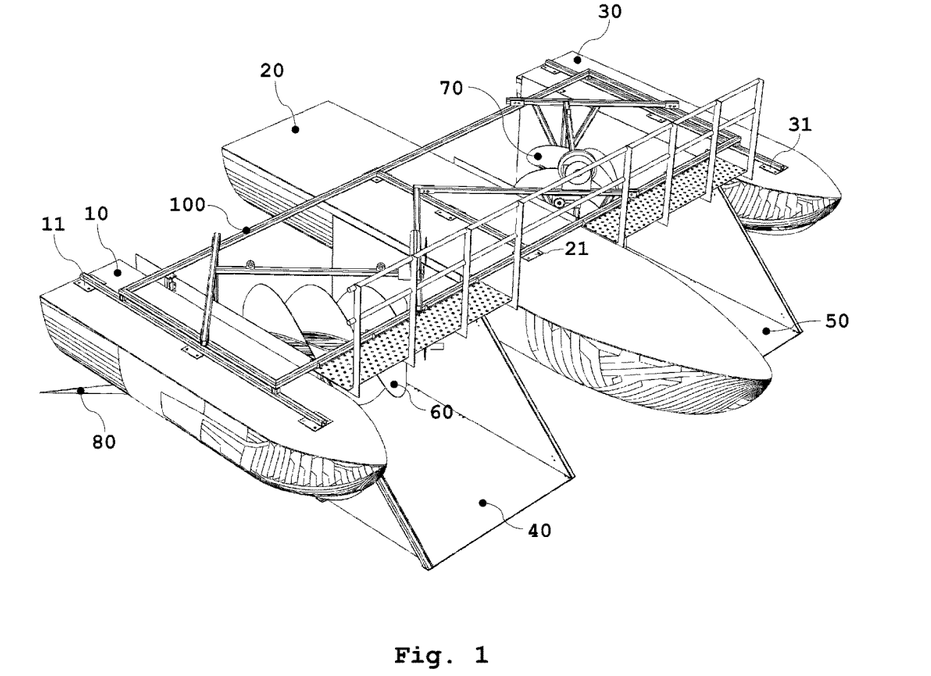
FIG. 1 shows the turbine device from a perspective view that is situated above the water surface where all essential parts are visible.

A floating screw turbines device, as depicted in FIG. 1, consists of three pontoons (10, 20, 30) spaced apart and fixed to the deck frame (100). The pontoons (10, 20, 30) can be formed in any manner known in the art, its technical role is to provide buoyancy and stability to the structure. The pontoons (10, 20, 30) can be manufactured as hollow metal or plastic bodies. Also, the pontoons (10, 20, 30) can be formed entirely from material having low specific weight which prevents pontoon sinking if ruptured, such as styrene or similar, with an adequate mechanical, i.e. plastic, protection of the cores' surfaces. The left pontoon (10) and the right pontoon (30) can be formed rather smaller as compared to the central pontoon (20) having in mind the weight distribution of the whole system. The pontoons (10, 20, 30) should be shaped in the shape of a boat in order to minimise river drag. It is understandable that the pontoons have to be properly moored in a manner that is well known in the art.

In the preferred embodiment, each pontoon (10, 20, 30) has its own fastening beam (11, 21, 31) that is from one side fixed to the pontoon (10, 20, 30) and from another side is fixed to the deck frame (100), via standard screws to allow easy mounting and dismounting as well as the maintenance. The fastening beams (11, 21, 31) and the deck frame (100) are manufactured as a standard metal construction, preferably from steel profiles. The deck frame (100) should have the ability to carry generators and other equipment necessary to convert turbine rotary motion into electric current, if necessary. The energy conversion procedure is well documented in the prior art so this procedure will not be elaborated here.

Figure 3:
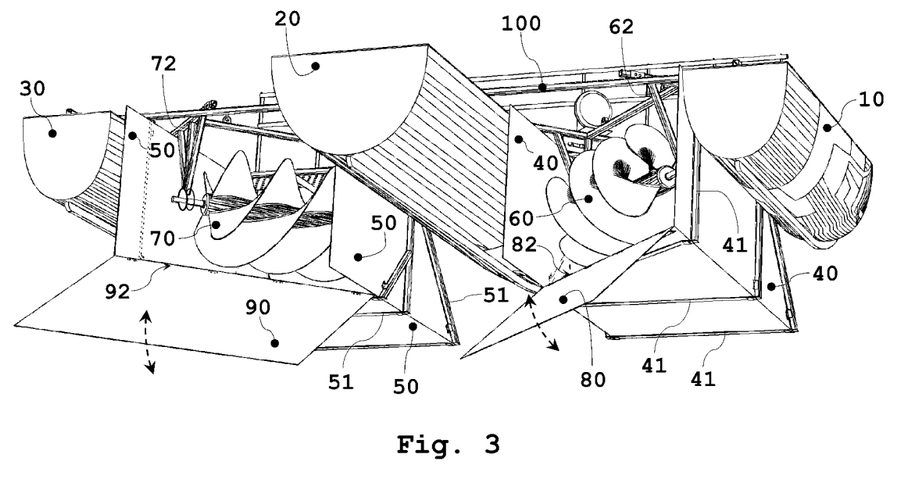
FIG. 3 shows the turbine device from a perspective view that is situated at the bottom of the river and from which the rear part of the turbine devices is depicted as well as the mutual distribution of each element.
Figure 5:
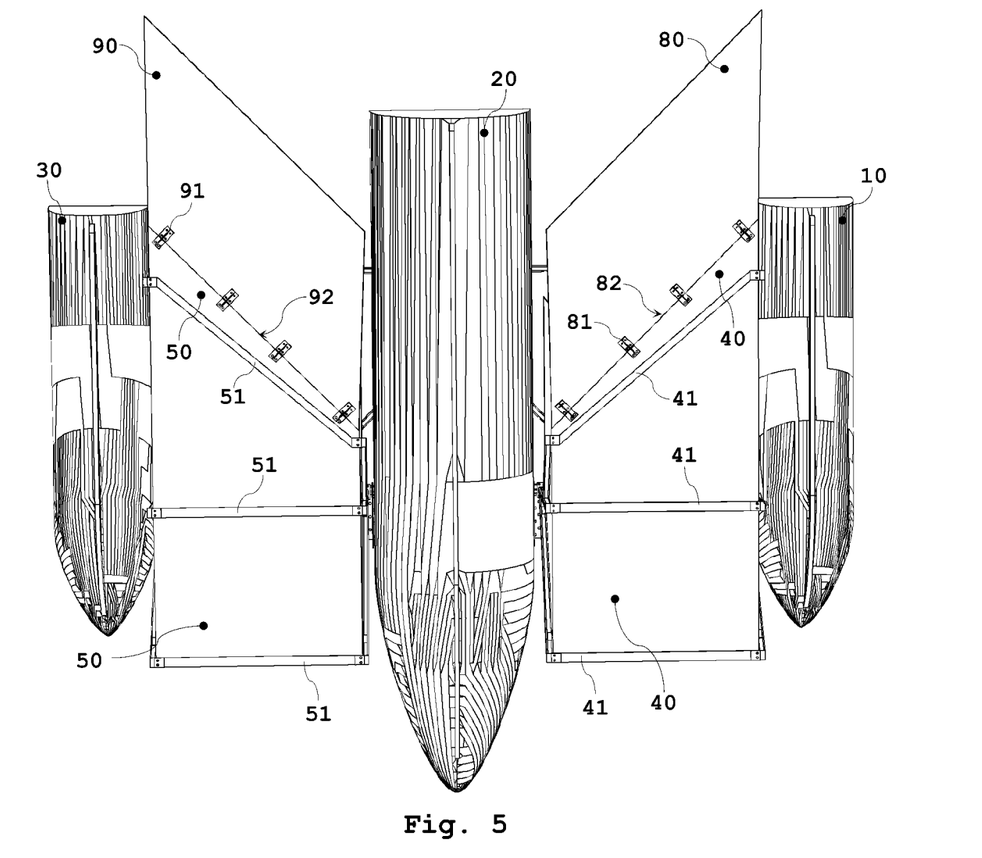
FIG. 5 shows the turbine device from below; the position of the deflector/diffusor connection lines and their corresponding hinges are visible as well as the deflector/diffusor geometry.

The left water duct (40) is situated between the left pontoon (10) and the central pontoon (20) and is fixed to the deck frame (100) via duct holders (41); as shown in FIGS. 3 and 5. Two or even more duct holders (41) are distributed in a way so as to enclose the bottom and both sides of the left water duct (40) and securely fix the duct (40) to the deck frame (100). The inlet of the left water duct (40) is depicted in FIG. 1 and the outlet of the left duct (40) is best visible in FIG. 3. In the present embodiment, the duct (40) has a rectangular cross-section, except at its inlet and outlet part. The left water duct (40) can be formed from any metal or plastic material that is durable and resistant to various mechanical strains. The bottom of said duct (40) ends with the left deflector/diffusor line (82), is shown in FIG. 5.

The right water duct (50) is situated between the right pontoon (30) and the central pontoon (20) and is fixed to the deck frame (100) via duct holders (51); as shown in FIGS. 3 and 5. Two or even more duct holders (51) are distributed in a way so as to enclose the bottom and both sides of the right water duct (50) and perform the role of securely fixing the duct (50) to the deck frame (100). The inlet of the right water duct (50), which is identical to the inlet of the left water duct (40), is depicted in FIG. 1 and the outlet of right duct (50) is best visible in the FIG. 3. In the present embodiment, the duct (50) has a rectangular cross-section, except at its inlet and outlet parts. The right water duct (50) can be formed from any metal or plastic material that is durable and resistant to various mechanical strains. The bottom of the duct (50) ends with the right deflector/diffusor line (92) and is shown in FIG. 5.

Figure 2:
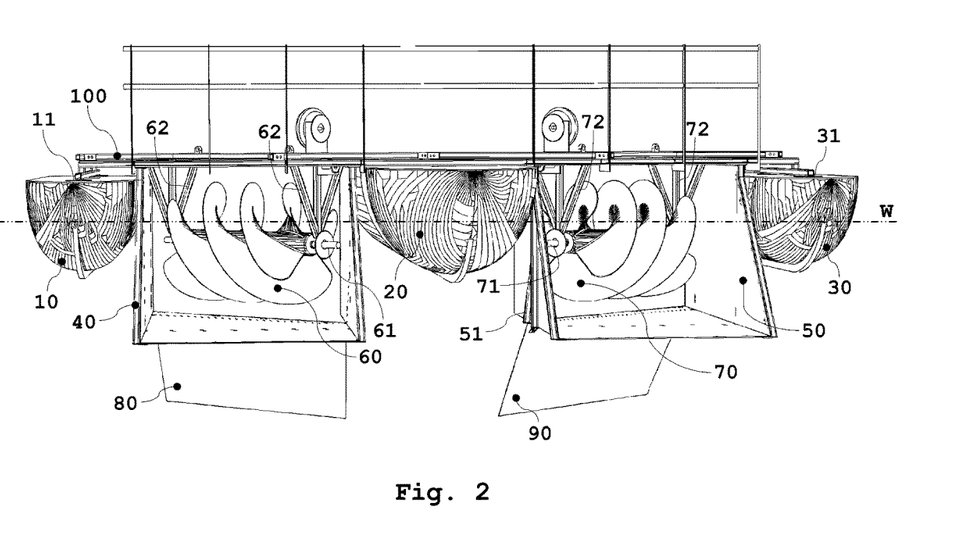
FIG. 2 shows the turbine device as seen from a front perspective where both ducts are shown with their interiors.
Figure 6:
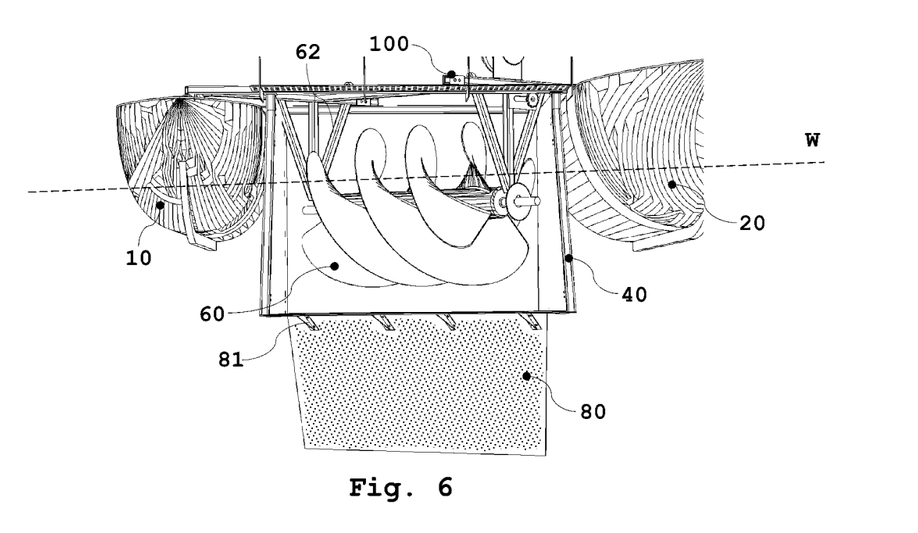
FIG. 6 shows the left turbine duct with its left turbine as seen from the front; with the left deflector's/diffusor's area with hinges behind the duct.

The left screw turbine (60) is positioned within the left water duct (40) as depicted in FIG. 2. The left screw turbine (60) is fixed by a pair of turbine shaft holders (62), holding the left turbine shaft (61) on its ends. The shaft holders (62) are connected with the deck frame (100) in a way so as to adjust the screw turbine (60) to be partially or fully immersed in the river, in parallel with the water surface, as shown in FIGS. 6 and 2 where letter W denotes the water surface. By this, the left screw turbine (60) is capable of freely rotating within the left water duct (40).

The right screw turbine (70) is positioned within the right water duct (50) as depicted in FIG. 2. The right screw turbine (70) is fixed by a pair of turbine shaft holders (72) holding the right turbine shaft (71) on its ends. The shaft holders (72) are connected with the deck frame (100) in a way so as to adjust the screw turbine (70) to be partially or fully immersed into the river, in parallel with the water surface, as shown in FIG. 2. By this, right screw turbine (70) is capable of freely rotating within the right water duct (50).

The turbine shaft (61, 71) motion can be transferred by appropriate belt or chain transmission to another gear system or generator system.

Figure 4:
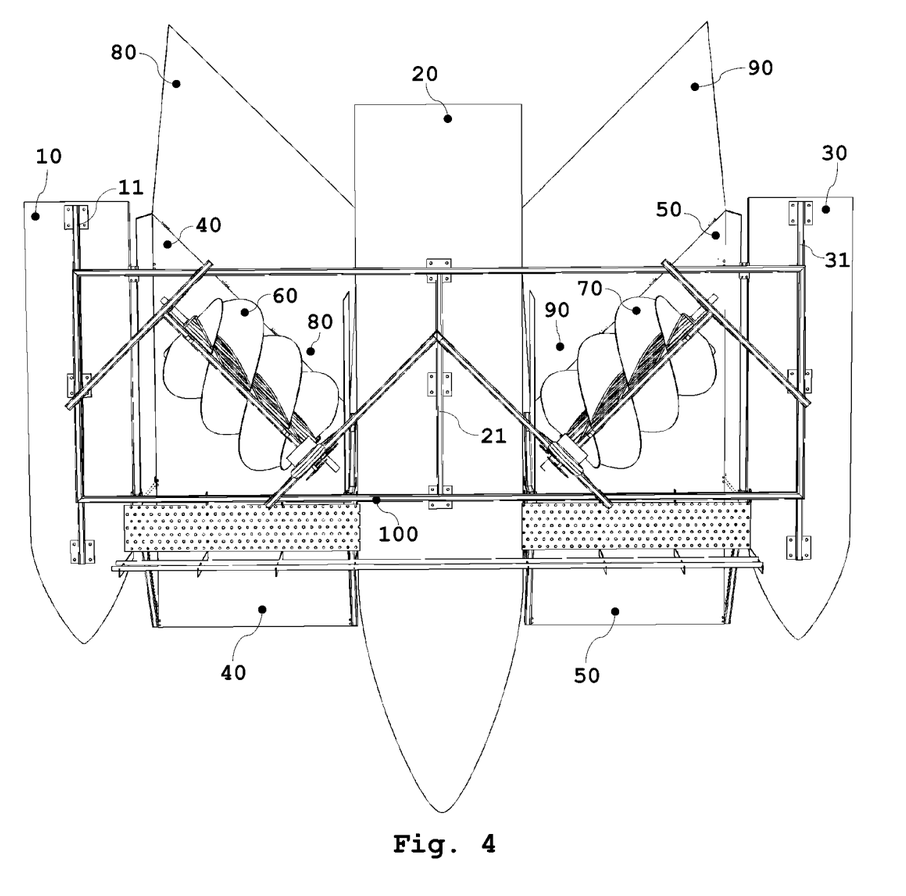
FIG. 4 shows the turbine device from above; the position of the screw turbines and their corresponding pitches are visible. Also, the deflector/diffusor geometry is revealed.

The left screw turbine (60) and the right screw turbine (70) are mounted in corresponding ducts (40, 50) forming a V formation, as shown in FIG. 4. Corresponding turbine shafts (61, 71), when extrapolated out from their screw turbines (60, 70) intersect at a point situated at the centre of the plane of symmetry. This plane of symmetry is the plane which divides the turbine system into two mirror symmetrical parts, passes through the central axis of the central pontoon (20) and is perpendicular to the water surface.

The turbine shafts (61, 71) are situated parallel to the water surface and are both inclined at the same angle relative to the central pontoon (20). It is known in the art that the best performances are achieved by the turbines inclined by an angle between 300 and 600 to the river flow, i.e. relative to the central pontoon (20). The inclination angle selection strongly depends on the used screw turbine type, i.e. their pitch, number of blades, blades endings etc. In an aspect of the present invention, the screw turbines (60, 70) have the same dimensions within manufacture practice, were said turbines (60, 70) have a mirror symmetrical pitch of the screws measured in regard to the centre plane of symmetry.

Namely, it is known in the prior art, i.e. WO2012/019307A1 we cite hereby, that such a construction is favourable regarding the stability in operation, lateral force compensation, vibration cancelation etc. Rotation of the screw turbine shafts (61, 71) can be easily converted to other energy forms.

Screw turbines (60, 70) are manufactured as any other Archimedes' (helical) screw type turbine that is known in the art; from metal or metal alloys and even composite materials. Turbine shafts (61, 71) are generally formed from adequate metal or metal alloys, as known in the art.

In addition, screw turbines are extremely resistant to small timbers, wooden beams, broken wood branches, plastic containers and other flowing plastic objects, or similar flowing obstacles. Screw turbines are friendly to fish due to their rather slow rotations and space between blades by which it is almost impossible to hurt river or marine life.

All the before said is more or less known in the prior art. However, the core of an aspect of this invention is the part that is responsible for the adjustment of deflectors/diffusors in order to maximise the extracted energy from the screw turbines. So, each of water ducts (40, 50) have, at the water outlet behind the corresponding turbines (60, 70), a corresponding deflector/diffusor (80, 90); as shown in FIGS. 3, 4 and 5. Each deflector/diffusor (80, 90) is connected by a set of hinges (81, 91) to the corresponding deflector/diffusor connection line (82, 92) situated at the bottom of the corresponding water duct (40, 50); as shown in FIG. 5. The deflectors/diffusors (80, 90) can be manufactured from any convenient material known in the art, preferably from the same material as used for the water duct (40, 50) formation. The hinges (81, 91) are distributed along the deflector connection lines (82, 92) in order to ensure the proper functioning of the deflectors/diffusors (80, 90), i.e. to provide the possibility of changing the pitch of each deflector/diffusor independently.

In the preferred embodiment, the left deflector/diffusor connection line (82) is parallel to the left turbine shaft (61), and the right deflector/diffusor connection line (92) is parallel to the right turbine shaft (71). The deflector/diffusor connection lines (82, 92), when extrapolated, intersect at the point situated at the centre plane of symmetry. Finally, this setup enables deflectors/diffusors (80, 90) to rotate, i.e. change their pitch, around their corresponding connection lines (82, 92), thus affecting the water flow velocity through the water ducts (40, 50) by controlling their relative pitch with respect to the floor of the water ducts (40, 50).

The deflectors/diffusors (80, 90) ends, i.e. the lines that are situated opposite of the corresponding deflector/diffusor connection lines (82, 92) can be formed in various forms. However, CFD simulation shows that the preferred solution is the one where the deflectors/diffusors (80, 90) ends are formed to be parallel to corresponding deflector/diffusor connection lines (82, 92).

In the simplest solution, the deflectors/diffusors (80, 90) are held in a desired position relative to the water duct (40, 50) by locking the openness of the hinges (81, 91) via a set of wedges or similar mechanical devices that block the hinges (81, 91). This is a purely mechanical way of setting the deflectors/diffusors (80, 90) in their desired pitches, however—it is effective. Considering the fact that the flow velocity does not oscillate much, this represents an acceptable approach for the disclosed technical problem.

In a more sophisticated solution, the deflectors/diffusors (80, 90) are held in a desired position relative to the water duct (40, 50) in a manner that is continuously adjustable in time. This is possible by using hydraulic or electromechanical actuators linked with the deflectors/diffusors (80, 90). In even more sophisticated solution, deflectors/diffusors (80, 90) are continuously adjustable in accordance with the inlet water flow velocity where the deflectors'/diffusors' (80, 90) pitch is selected according to a previously performed computational fluid dynamics (CFD) simulation for the turbine device in order to maximize fluid velocity across the water ducts (40, 50). For the later solution it is necessary to measure water flow velocity in one or more points. It is known in the art that this can be performed via mechanical means, or contactless, for instance with a Doppler radar used for measuring purposes such as:

geolux-radars.com/portfolio category/hydrology/, incorporated by reference herein.

It is also possible to use a self-adjusting system, i.e. proportional-integral-derivative (PID) controller; with a feedback mechanism which regulates the deflectors'/diffusors' position in relation to velocity of the fluid flow.

If necessary, it is possible to partially fill the pontoons with the water, especially on the deflector/diffusor sides, in order to compensate for deflector/diffusor forces that tend to push the rear end of the pontoons upwards. The simplest way to achieve the latter is by using pontoons' water tanks, situated at the rear end of the pontoons, equipped with valves that enable a specific amount of water to be poured in. The water can be expelled from the tanks by compressed air in a manner already known in the art. Thus the pontoons' buoyancy and weight distribution can be easily regulated according to an aspect of the invention.

Finally, it should be noted that two or more identical or similar floating screw turbine devices with adjustable rear deflectors/diffusors can be used in parallel, serial or mixed configuration for converting the fluid flow into rotational mechanical power and then into electricity—if necessary; as already disclosed in the art.

A few lines should be devoted to the CFD calculations for validating the present deflector/diffusor model which can be performed in any of the following computer programs/web services based on the Navier-Stokes equations:

OpenFoam® (www.openfoam.org), Elmer (www.csc.fi/web/elmer), ANSYS Fluent® (www.ansys.com), Flow-3D® (www.flow3d.com), COMSOL (www.comsol.com), Abaqus (www.3ds.com), Conself (www.conself.com), SimulationHub (www.simulationhub.com), simFlow (www.sim-flow.com), SimScale (www.simscale.com) and others or computer programs/web services based on the lattice Boltzmann equation such as: XFlow® (www.xflowcfd.com) and others.

The procedure is performed in several steps. Firstly, the geometry of the turbine system has to be drawn in any suitable CAD program such as:

FreeCAD® (www.freecadweb.org), CAELinux® (www.caelinux.com/CMS/), SketchUp® (www.sketchup.com), Solidworks® (www.solidworks.com), Catia® (www.3ds.com) and exported to any of the before mentioned CFD programs/web services.

The solution is sought for the mathematical problem described by the following formula:

$$V_{out} = \text{Model}(V_{in}, S)$$

where $V_{out}$ denotes duct water velocity as the scalar function "Model" of river velocity $V_{in}$ and the parameter S which denotes the diffusor's area projected perpendicular to the river water flow. All input variables are also scalars.

The CFD computer program is used to map/model the entire 3D space where selected points in the mentioned space have coordinates ($V_{in}$, S, $V_{out}$).

The CFD calculations were performed simulating the turbine as shown in FIG. 1. The input data are set to correspond with the real physical model. Each duct is projected to have a cross-sectional area of 7.11 m×3.00 m that is approximately 21 sq. meters. Each duct was filed with water to the height of approximately 2.1 m; filling therefore each duct up to ⅔ of its height; that is reasonable to be achieved in operating conditions having in mind that this is a floating/submerged turbine system.

The used turbine has a 4 blade Archimedes screw type turbine, where one full blade turn is achieved across the whole length of the turbine shaft; FIG. 4. The configuration is inclined by 45° to the river flow; very similar to the system previously cited in document WO02004/067957A1.

The tests, i.e. CFD simulations, were performed with an initial set of fluid velocities at the beginning of the ducts to be: 0.5 m/s, 1.0 m/s, 1.5 m/s, 2.0 m/s, 3.0 m/s, 3.5 m/s. At the centre of each turbine, the water velocity across the duct is calculated in respect to the deflector's/diffusor's area, measured in sq. meters, projected perpendicular to the water flow. One half of such area, i.e. the projected deflector's/diffusor's area of only one duct is shown in FIG. 6.

Figure 7:
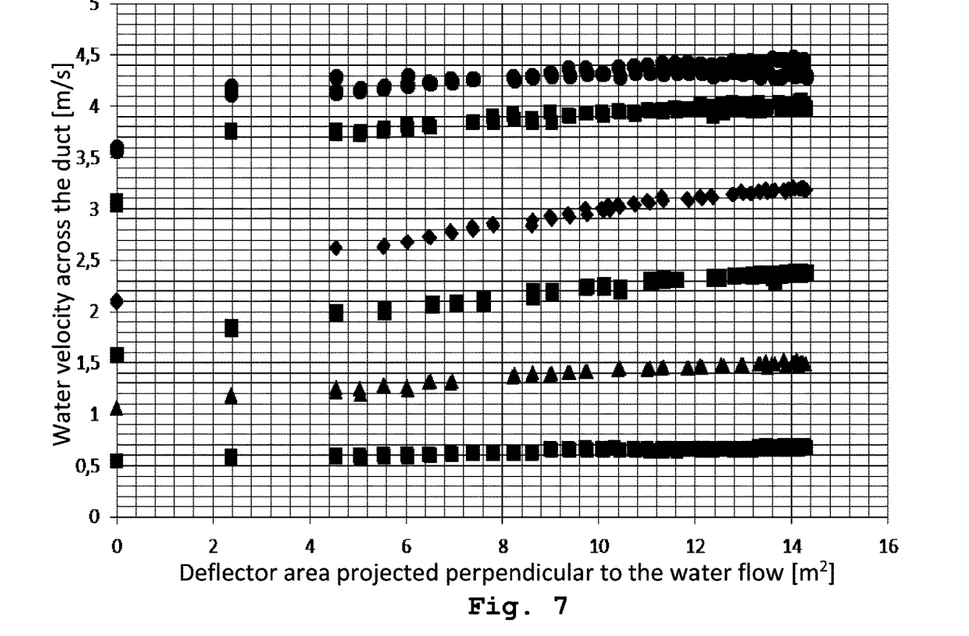
FIG. 7 shows the water velocity across the ducts as a function of deflector/diffusor cross-section area, obtained by CFD simulation for all cases.

The results are plotted in FIG. 7; increasing the deflectors'/diffusors' area projected perpendicular to the water flow from 0-14 sq. meters leads to saturation in increasing of the water velocity across the duct by 50%—for an initial velocity of 1.0 m/s to an approximately 25% increase in case of the initial velocity equal to 3.5 m/s. It should be noted that the 14 sq. meters, i.e. the saturation value, is approximately the value of the total cross-section of the duct which is filled with water and corresponds to approximately a 45° pitch of the rear deflectors/diffusors measured from the water line. Also, from FIG. 7, it is obvious that the deflectors/diffusors are more effective for slower water streams.

Figure 8:
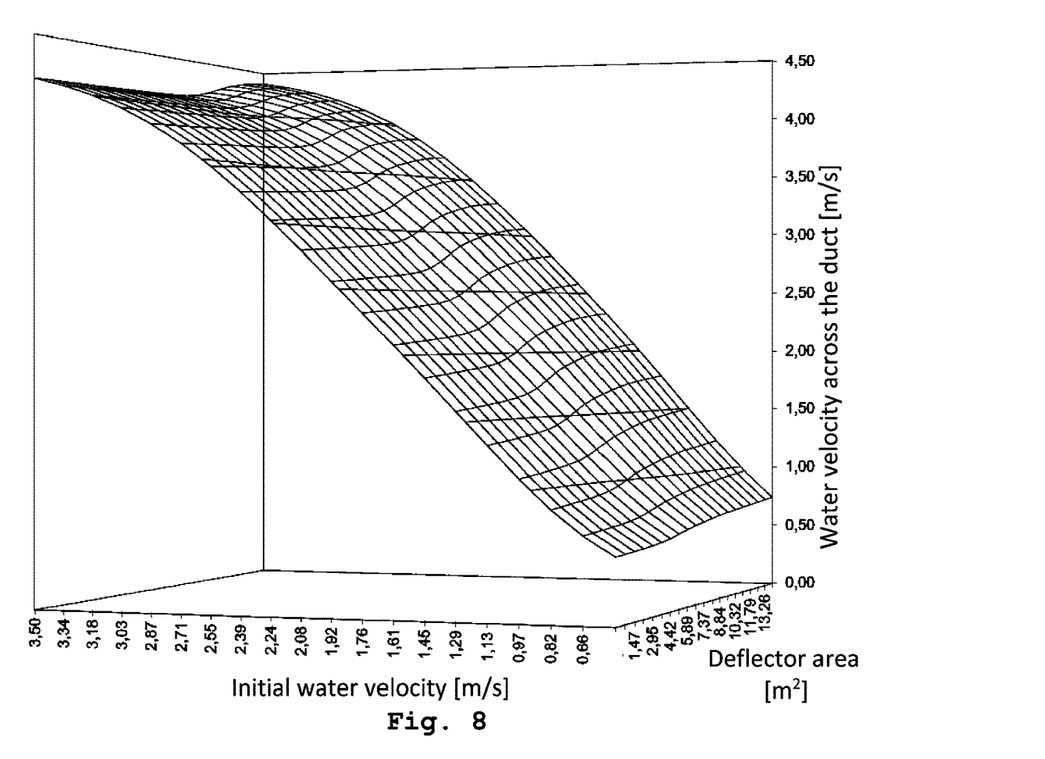
FIG. 8 shows the 3D graph of water velocity across the ducts as a function of deflector/diffusor cross-section area and initial water velocity, as learned by the neural network.

Now, the findings from the CFD simulations can be plotted in 3D space where the selected points in the mentioned space are ($V_{in}$, S, $V_{out}$). In order to establish the function "Model", various techniques may be used. In an aspect of the present invention an artificial neural network, with two hidden layers of neurons, is used to be trained to learn/emulate the "Model" function. Once the artificial neural network learns the system behaviour then control of the system is much more accurate than by using the previously mentioned PID control.

It is well known that PID method has serious limitations regarding the noise in derivate that produces large amounts of change in the output; as described in:
https://en.wikipedia.org/wiki/PID_controller#Limitations_of_PID_control On the other hand, the best control over a given system is possible to achieve with feed-forward control for which is important to have the detail knowledge of the entire behaviour of the system; as described in:
https://en.wikipedia.org/wiki/Feed_forward_(control)

A particularly relevant text regarding neural networks and control can be found in Nenad Koncar's PhD thesis: "Optimisation methodologies for direct inverse neurocontrol"; Imperial College of Science, Technology and Medicine; 1997:
http://users.cs.cf.ac.uk/O.F.Rana/Antonia.J.Jones/Theses/NenadKoncarThesis.pdf The article written by Stefansson, A., Koncar, N. & Jones, A. J. "A note on the Gamma test"; Neural Computing & Applications (1997) 5: 131;
http://link.springer.com/article/10.1007/BF01413858
describes a simple technique, the Gamma (or Near Neighbour) test, which in many cases can be used to considerably simplify the design process of constructing a smooth data model such as a neural network. Such a neural network can be further used for process steering or prediction of a system behaviour as discussed in detail in articles which cite the above mention prior art.

INDUSTRIAL APPLICABILITY

The industrial applicability of aspects of the invention is obvious. Aspects of the present invention are directed to maximise the conversion rate of kinetic water flow energy into rotational energy via semi-submersed/fully-submerged screw turbine device using rear deflectors/diffusors.

REFERENCES

10—left pontoon
11—fastening beam
20—central pontoon
21—fastening beam
30—right pontoon
31—fastening beam
40—left water duct
41—duct holder
50—right water duct
51—duct holder
60—left screw turbine
61—left turbine shaft
62—turbine shaft holder
70—right screw turbine
71—right turbine shaft
72—turbine shaft holder
80—left deflector/diffusors
81—deflector/diffusors hinge
82—left deflector/diffusors connection line
90—right deflector/diffusors
91—deflector/diffusors hinge
92—right deflector connection line
100—deck frame

The invention claimed is:

1. A floating screw turbines device with adjustable rear deflectors/diffusors, where the device comprises:
a left, a central, and a right pontoon spaced apart and fixed to a deck frame; where a left water duct is situated between the left pontoon and the central pontoon, and where a right water duct is situated between the central pontoon and the right pontoon;
each of the water ducts are fixed to the deck frame and to adjacent ones of the left, the central, and the right pontoons via duct holders respectively;
a left screw turbine is fixed within the left water duct by a first pair of turbine shaft holders holding the left turbine shaft at respective ends of the left turbine shaft; and a right screw turbine which is fixed within the right water duct by a second pair of turbine shaft holders holding the right turbine shaft at respective ends of the right turbine shaft; where the first and second pair of turbine shaft holders are fixed to the deck frame;
wherein the left screw turbine is mounted in the left water duct and the right screw turbine in mounted in the right duct forming a V formation, where the turbine shafts, when extrapolated, intersect at a first point situated at a centre plane of symmetry which passes through a central axis of the central pontoon and is perpendicular to a water surface; and where the left turbine shaft and the right turbine shaft are situated parallel to the water surface and are both inclined by a same angle relative to the central pontoon; the screw turbines have mirror symmetrical pitch of the screws measured in regard to the centre plane of symmetry;

wherein
- each of the water ducts have, at a water outlet behind the corresponding turbines, a corresponding deflector/diffusor connected by a set of hinges to a corresponding deflector/diffusor connection line situated at a bottom of the corresponding water duct;
- wherein the left deflector/diffusor connection line is parallel to the left turbine shaft, and the right deflector/diffusor connection line is parallel to the right turbine shaft, the deflector/diffusor connection lines, when extrapolated, intersect at a second point situated at the centre plane of symmetry; and
- the deflectors/diffusors being capable of rotating around their corresponding connection lines, thus affecting a water flow velocity across the water ducts by controlling their relative pitch with respect to the floors of the water ducts.

2. The floating screw turbines device with adjustable rear deflectors/diffusors according to claim 1, wherein a selected angle at which the turbines are inclined relative to the central pontoon to form a symmetrical V formation is in a range between 30° to 60°.

3. The floating screw turbines device with adjustable rear deflectors/diffusors according to claim 1, wherein an end of the deflector/diffusor is formed to be parallel to a corresponding deflector connection line.

4. The floating screw turbines device with adjustable rear deflectors/diffusors according to claim 1, wherein the deflectors are held in a desired position relative to the water duct by locking an openness of hinges by a set of wedges.

5. The floating screw turbines device with adjustable rear deflectors/diffusors according to claim 1, wherein the deflectors/diffusors are continuously adjustable in time to a desired position relative to the water ducts by using hydraulic or electromechanical actuators.

6. The floating screw turbines device with adjustable rear deflectors/diffusors according to claim 5, wherein the deflectors/diffusors are continuously adjustable in accordance with the inlet water flow velocity where pitch of the deflectors/diffusors is selected according to previously performed computational fluid dynamics simulation for the floating screw turbine device in order to maximize fluid velocity across the water ducts.

7. The floating screw turbines device with adjustable rear deflectors according to claim 5, wherein the deflectors/diffusors are continuously adjustable in accordance with the inlet water flow velocity where the deflectors/diffusors pitch is selected via proportional-integral-derivative (PID) controller in order to maximise fluid velocity across the water ducts.

8. The floating screw turbines device with adjustable rear deflectors/diffusors according to claim 6, wherein water flow velocity which is measured at one or more points by contact or non-contact velocity measure systems.

9. The floating screw turbines device with adjustable rear deflectors/diffusors according to claim 2, wherein the deflector/diffusor ends are formed to be parallel to the corresponding deflector connection lines.

10. The floating screw turbines device with adjustable rear deflectors/diffusors according to claim 2, wherein deflectors/diffusors which are continuously adjustable in time to the desired position relative to the water ducts by using hydraulic or electromechanical actuators.

11. The floating screw turbines device with adjustable rear deflectors/diffusors according to claim 3, wherein deflectors/diffusors which are continuously adjustable in time to the desired position relative to the water ducts by using hydraulic or electromechanical actuators.

12. The floating screw turbines device with adjustable rear deflectors/diffusors according to claim 7, wherein water flow velocity which is measured at one or more points by contact or non-contact velocity measure systems.

13. The floating screw turbines device with adjustable rear deflectors/diffusors according to claim 6, wherein water flow velocity which is measured at one or more points by Doppler radar devices mounted on the deck frame.

14. The floating screw turbines device with adjustable rear deflectors/diffusors according to claim 7, wherein water flow velocity which is measured at one or more points by Doppler radar devices mounted on the deck frame.

* * * * *